United States Patent [19]
Meuth

[11] Patent Number: 5,921,517
[45] Date of Patent: Jul. 13, 1999

[54] ULTRA HIGH STRENGTH CLAMP ASSEMBLY

[75] Inventor: Thomas Larry Meuth, Spring, Tex.

[73] Assignee: Offshore Clamp & Protector Technologies, Inc., Spring, Tex.

[21] Appl. No.: 08/814,434

[22] Filed: Mar. 10, 1997

[51] Int. Cl.⁶ ................................................. F16L 3/08
[52] U.S. Cl. .................... 248/230.8; 248/74.3; 403/392; 24/68 PP
[58] Field of Search ............................. 248/230.1, 230.5, 248/230.8, 230.9, 74.1, 74.3, 74.4, 229.1, 218.4; 403/392, 389, 385, 396; 24/68 PP

[56] References Cited

U.S. PATENT DOCUMENTS

| | | | |
|---|---|---|---|
| 1,225,301 | 5/1917 | Wolfe | 248/230.5 X |
| 1,615,092 | 1/1927 | Longanecker | 24/68 PP X |
| 1,633,129 | 6/1927 | Snapp | 24/68 PP X |
| 2,169,102 | 8/1939 | Lemont | 403/389 |
| 4,059,872 | 11/1977 | Delesandri | 403/385 X |
| 4,200,325 | 4/1980 | Johnson | 294/74 |
| 4,397,436 | 8/1983 | Lyon et al. | 248/68.1 |
| 4,484,962 | 11/1984 | Dienes et al. | 156/49 |
| 4,678,147 | 7/1987 | Barnes et al. | 248/74.1 |
| 4,854,015 | 8/1989 | Shaull | 24/16 R |
| 5,020,749 | 6/1991 | Kraus | 248/74.3 |
| 5,083,346 | 1/1992 | Orton | 248/74.3 X |
| 5,136,759 | 8/1992 | Armour, II | 24/442 |
| 5,598,995 | 2/1997 | Meuth et al. | 248/74.3 |

OTHER PUBLICATIONS

Knoff, Koralek and Eareckson, "Prediction of Long Term Strength Retention of Kevlar® Aramid Fibers in Aqueous Environments," undated, 11 pages.

Dupont Data Manual, "Kevlar* for Fiber Optic and Other Cables," Jul. 1991, pp. 4–1 to 4–12.

Primary Examiner—Ramon O. Ramirez
Assistant Examiner—Stephen S. Wentsler
Attorney, Agent, or Firm—Akin, Gump, Strauss, Hauder & Feld, L.L.P.

[57] ABSTRACT

A clamp assembly for clamping an elongate member to a support member. The clamp assembly includes a flexible strap having first and second ends. The flexible strap extends substantially around the elongate and support members. The first and second ends are adapted to be coupled to each other or to the support member. The clamp assembly also includes a tensioner assembly having first and second tensioner bars spaced parallel to one another. Each of the first and second tensioner bars includes a bullnose face and the bullnose faces are in opposing relationship to one another. The tensioner assembly also includes an adjusting member for adjusting the spacing between the first and second tensioner bars. The flexible strap extends twice through the space between the first and second tensioner bars.

12 Claims, 4 Drawing Sheets

ULTRA HIGH STRENGTH CLAMP ASSEMBLY

BACKGROUND OF THE INVENTION

1. Field of the Invention

The present invention relates generally to clamp assemblies for connecting one member to a support member, and more particularly to an ultra high strength clamp assembly to attach a pipe or line, such as an umbilical line, to another pipe. The present invention is particularly adapted for use as a subsea clamp assembly to attach an umbilical line to a choke or kill line of a subsea riser.

2. Description of the Related Art

The need often arises for a clamp assembly to attach a cable, hose or pipe to a support member or pipe. Typically, the cable, hose or pipe is run along the length of the support member or pipe. Many types of clamp assemblies have been used to secure the members to one another. The members may be horizontally positioned or vertically positioned. It is generally desirable that the clamp assembly be capable of quick installation while securely attaching the clamped members to one another. Additionally, it is desirable that the clamp assembly be lightweight and relatively inexpensive.

In the offshore drilling and production industry, it is frequently necessary to run umbilical lines hundreds and even thousands of feet below the support vessel or drilling or production platform down to the sea floor and beyond. Typically, the umbilical lines, which may include electric, MUX (fiber optics), and hydraulics, are required to be attached to a support member, such as a choke or kill line, or mud line on a subsea riser system. Due to the high cost of working in such environments, it is critical that the clamp assembly be easy to install, quickly installed and reliable and dependable to firmly secure the clamped members. In the offshore industry, limited platform space is available for the workman to install the clamp assemblies and sometimes the workman is limited to accessing the riser from a single side. Thus, it is vitally important that the clamp assembly be easy to install from a location on both sides or sometimes one side of the riser.

In the past, riser clamps comprised of two half sections joined about the riser have been used. These riser clamps have been fabricated completely from steel or stainless steel. Such clamps are subject to rust and corrosion and add unwanted weight to the entire clamped assembly. Additionally, such clamps tend to be time consuming to install. Another type of riser clamp that has been used is similar to a large hose clamp which screws tight and directly clamps the clamped members to the support member. This type of clamp is subject to damaging the clamped members and is time consuming to install.

U.S. Pat. No. 5,598,995 to Meuth discloses a clamp assembly having a receptacle adapted to at least partially receive an elongate member, a pair of flexible support straps connected to the receptacle, and a pair of flexible clamping straps. The pair of flexible support straps are capable of matingly engaging one another around a support member and the pair of flexible clamping straps are capable of matingly engaging one another around one or more elongate members and the support member. The receptacle includes a receptacle body made of high density polyurethane foam having a recess therein adapted to at least partially receive the elongate member. A pivotable buckle is attached to one of the flexible clamping straps for securely tensioning the pair of clamping straps around the elongate member or members and the support member. An adjustment assembly is attached to one of the flexible clamping straps. The adjustment assembly comprises an elastomeric adjuster attached to one of the flexible clamping straps and an adjustment patch attached to the elastomeric adjuster. The adjustment patch is capable of matingly engaging one of the flexible clamping straps. The pairs of flexible support straps and flexible clamping straps engage with hook and loop type fasteners.

It is desirable to have an ultra high strength clamp assembly that is lightweight, easy to install, and capable of being quickly installed. It is also desirable that the ultra high strength clamp assembly be economical in addition to firmly securing an elongate member to a support member. The clamp assembly should also provide protection against abrasion at the contact points with the clamped members.

BRIEF SUMMARY OF THE INVENTION

The present invention is an ultra high strength clamp assembly utilizing a flexible strap to securely clamp an elongate member to a support member. The ultra high strength clamp assembly is lightweight, easy to install, and capable of being quickly installed. The clamp assembly is economical and firmly secures the clamped members to one another.

The ultra high strength clamp assembly includes a flexible strap having first and second ends. The flexible strap extends substantially around the elongate and support members. The flexible strap is secured around the elongate and support members. The first and second ends are adapted to be coupled to each other or to the support member or to be wrapped twice around the two members resulting in no buckle or attachment being required. The clamp assembly also includes a tensioner assembly having first and second tensioner bars spaced parallel to one another. Each of the first and second tensioner bars includes a bullnose face and the bullnose faces are in opposing relationship to one another. The tensioner assembly also includes an adjusting member for adjusting the spacing between the first and second tensioner bars. The flexible strap extends twice through the space between the first and second tensioner bars, which encloses around the elongate member. In use, the first and second tensioner bars are situated substantially between the elongate member and the support member.

BRIEF DESCRIPTION OF THE VIEWS OF THE DRAWINGS

In order to more fully understand the drawings referred to in the detailed description of the present invention, a brief description of each drawing is presented, in which.

DETAILED DESCRIPTION OF THE INVENTION

Figure 1:
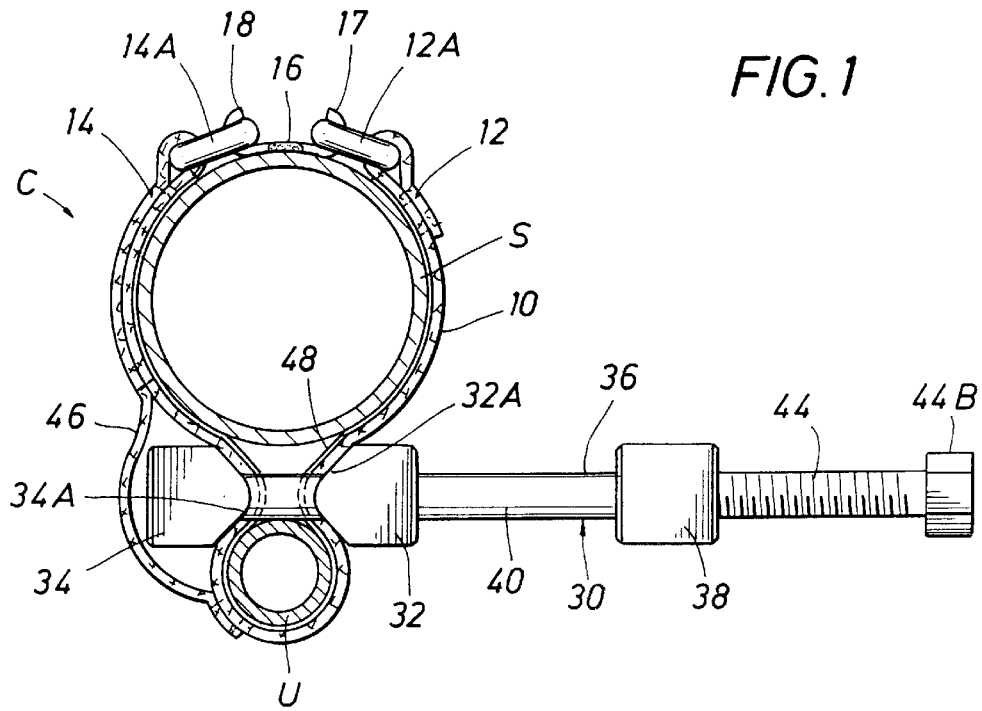
FIG. 1 is a top plan view of a first embodiment of the ultra high strength clamp assembly showing an umbilical member clamped to a support member.
Figure 2:
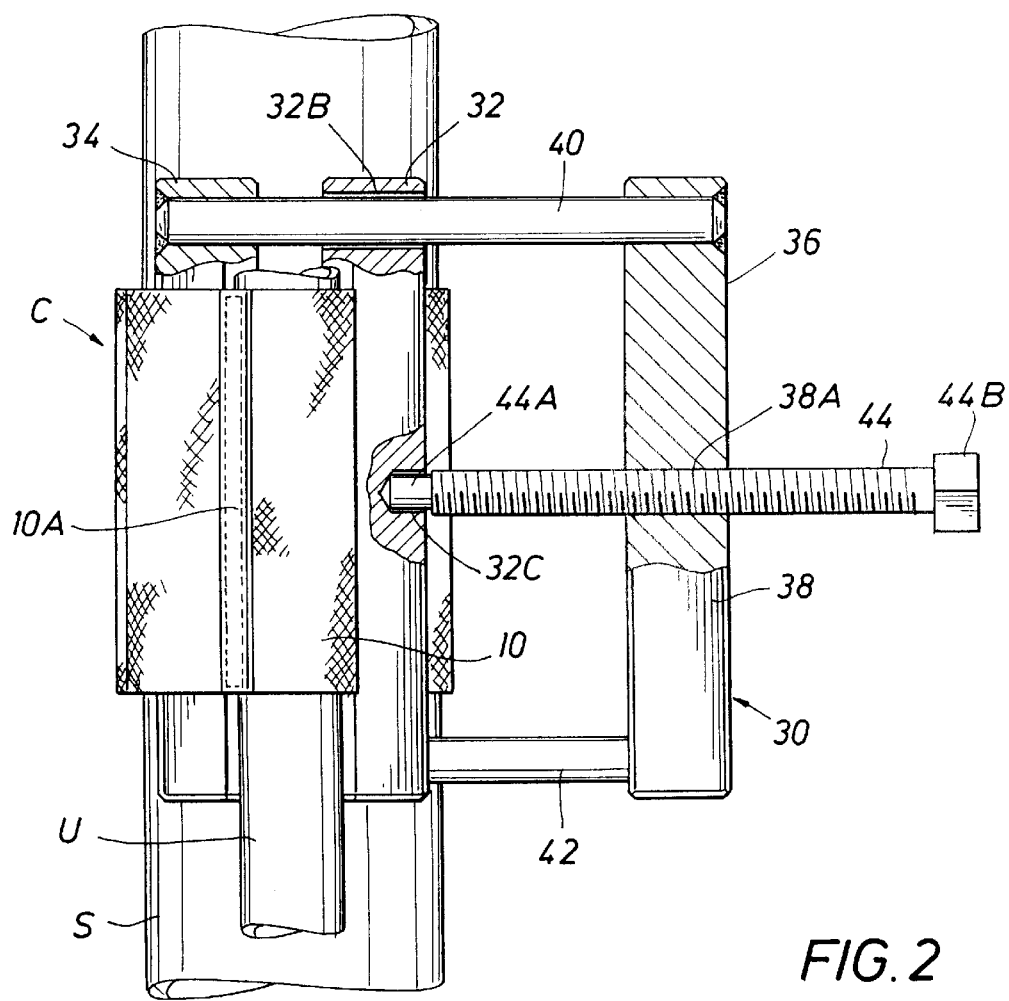
FIG. 2 is a front elevational view of the first embodiment of the ultra high strength clamp assembly of FIG. 1.
Figure 3:
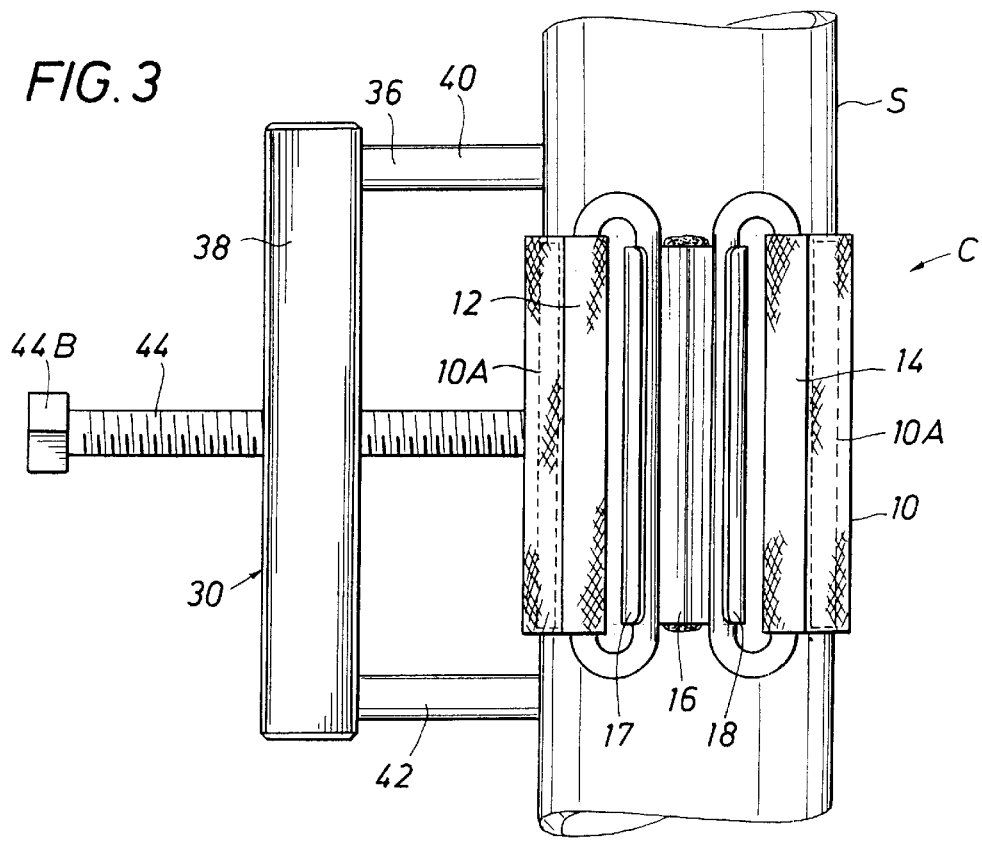
FIG. 3 is a rear elevational view of the first embodiment of the ultra high strength clamp assembly of FIG. 1.

Referring now to the drawings in greater detail, the ultra high strength clamp assembly of the present invention, generally designated by the letter C, for clamping an umbilical or elongate member U to a support member S is shown in a first embodiment in FIGS. 1–3. The ultra high strength clamp assembly C, comprises a strap 10, preferably flexible, having first and second ends 12 and 14, respectively, and a tensioner assembly 30 as shown in FIGS. 1 and 3.

Referring to FIG. 1, the flexible strap 10 has a length sufficient to allow the strap 10 to extend substantially around the elongate and support members U and S, respectively. The first and second ends 12 and 14, respectively, are adapted to be coupled to each other or to the support member S. Coupling the ends 12 and 14 to each other can be accomplished in a variety of ways, as for example with mating fasteners, buckles, or a hook and ring arrangement. In the drawings, the coupling is shown as comprising a pair of end rings 12A and 14A secured to the first and second ends 12 and 14, respectively. Preferably, the pair of end rings 12A and 14A are continuous rings and the ends 12 and 14 of the flexible strap 10 have been extended through the end rings 12A and 14A, respectively, forming loops with stitching 10A to secure the pair of end rings 12A and 14A in place. A coupling bracket 16 includes a pair of longitudinal hooks 17 and 18 as shown in FIGS. 1 and 3. Preferably, the coupling bracket 16 is secured, by welding, to the support member S. The pair of longitudinal hooks 17 and 18 are adapted to receive the pair of end rings 12A and 14A, respectively, as shown in FIGS. 1 and 3.

The tensioner assembly 30 includes a first tensioner bar 32 and a second tensioner bar 34 as shown in FIGS. 1 and 2. The first and second tensioner bars 32 and 34, respectively, are elongate members, generally rectangular in shape. Each of the tensioner bars 32 and 34 include a bullnose face 32A and 34A, respectively, as shown in FIG. 1. The bullnose faces 32A and 34A are in opposing relationship to one another.

In the first embodiment of the present invention as shown in FIGS. 1–3, the tensioner assembly 30 also includes a frame 36 including a post 38 and a pair of rods 40 and 42 extending from the post 38. The pair of rods 40 and 42 are securely attached, preferably by welding, to the post 38. The first tensioner bar 32 includes a pair of holes 32B extending transversely through the first tensioner bar 32. Referring to FIG. 2, it is to be understood that only one of the pair of holes 32B has been shown and an identical hole 32B also extends through the first tensioner bar 32 near its lower end. The pair of holes 32B are sized and spaced to slidably receive the pair of rods 40 and 42 secured to the post 38.

With the first tensioner bar 32 slidably received on the frame 36, the second tensioner bar 34 is secured to the ends of the pair of rods 40 and 42 opposite the post 38. It is to be understood that the second tensioner bar 34 and the post 38 are rigidly secured to the pair of rods 40 and 42 and the first tensioner bar 32 is permitted to slide along the length of the pair of rods 40 and 42 between the post 38 and the second tensioner bar 34.

Referring to FIG. 2, the post 38 includes a transverse bore 38A therethrough. The bore 38A preferably includes a threaded portion and may be threaded along the entire length of the bore 38A. An adjusting member 44 is received in the bore 38A of the post 38. Preferably, the adjusting member 44 has threads and is threadedly received in the bore 38A. The adjusting member 44 includes a first end 44A which is allowed to contact the first tensioner bar 32 as shown in FIG. 2. The first end 44A contacts the first tensioner bar 32 in abutting contact or can be received within a blind bore 32C in the first tensioner bar 32. The adjusting member 44 also includes a drive portion 44B for rotatably driving the adjusting member 44. For example, the drive portion 44B can be a shaped head on the end of the adjusting member 44 as shown in FIGS. 1–3.

It is to be understood from the above-described construction of the present invention that the first and second tensioner bars 32 and 34, respectively, are spaced parallel to one another and the adjusting member 44 is used to forcibly slide the first tensioner bar 32 towards the second tensioner bar 34 during the clamping process as will be explained below.

Referring to FIGS. 1 and 2, the flexible strap 10 includes a loop 46 which secures the flexible strap 10 around the second tensioner bar 34. This eliminates the possibility of the flexible strap 10 becoming separated from the tensioner assembly 30 or vice versa. Still referring to FIG. 1, the flexible strap 10 preferably includes a rubber layer 48 or other like material for frictionally contacting the elongate and support members U and S, respectively. The rubber layer 48 provides non-abrasive, highly frictional contact with the elongate and support members U and S, respectively, during use of the clamp assembly C. Preferably, the flexible strap 10 is made from a high strength material. One suitable strap is a KEVLAR strap made of aramid fibers. KEVLAR is a registered trademark of E.I. Du Pont de Nemours & Company. KEVLAR aramid fibers will withstand the harsh environments of a subsea application. KEVLAR aramid fibers resist hydrolysis in salt water environments, has a high strength-to-weight ratio, combined with low stretch under load, and excellent creep resistance. The flexible strap 10 can also be a three-ply strap with an inner layer of aramid fiber sandwiched between outer layers of rubber. The rubber layers would be approximately 1/16 to 1/8 inch in thickness.

The installation of the clamp assembly C will now be described in detail with reference to FIGS. 1–3. Initially, the adjusting member 44 is generally retracted to allow sufficient spacing between the first and second tensioner bars 32 and 34, respectively. The ring 14A attached to the second end 14 of the strap 10 is hooked to the hook 18 of the coupling bracket 16. The first end 12, which is already extended through the spacing between the tensioner bars 32 and 34, is passed substantially around the umbilical member U and then fed back through the space between the tensioner bars 32 and 34. The end ring 12A secured to the first end 12 is then hooked onto the elongate hook 17 of the coupling bracket 16. As previously explained, other types of fastening arrangements to couple the first and second ends 12 and 14, respectively, are anticipated and within the scope of the present invention. Various means of connecting the ends 12 and 14 are well known to those of ordinary skill in the art.

The adjusting member 44 is rotated to drive the first end 44A against the first tensioner bar 32 and force the first tensioner bar 32 towards the second tensioner bar 34. As can be seen in FIG. 1, the continued advancement of the first tensioner bar 32 towards the second tensioner bar 34 eliminates the slack in the flexible strap 10 extending substantially around the umbilical and support members U and S, respectively. The flexible strap 10 contacts the smooth contoured bullnose faces 32A and 34A of the tensioner bars 32 and 34, respectively. The adjusting member 44 is advanced until suitable clamping force has been exerted on the assembly to ensure that the umbilical member U remains firmly clamped to the support member S.

Figure 4:
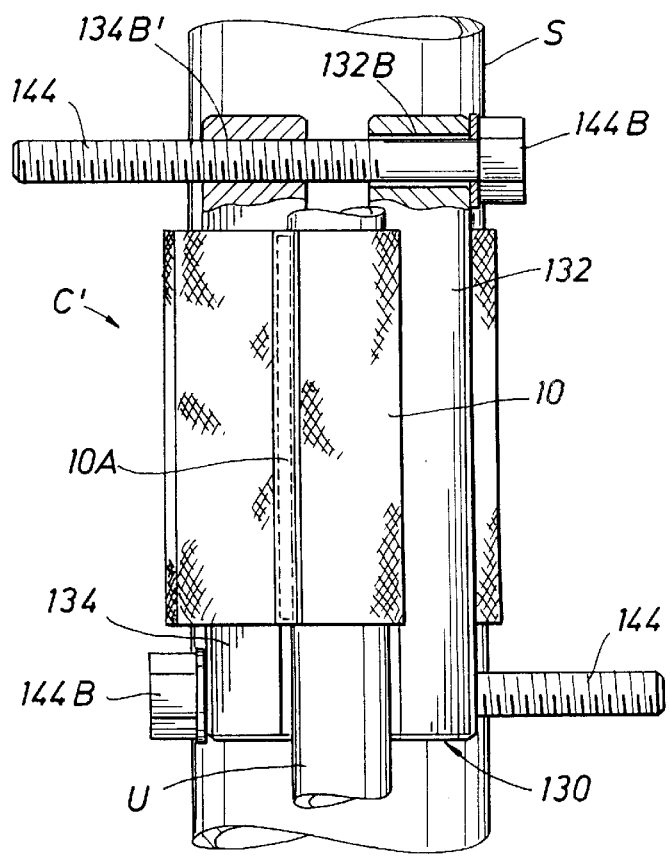
FIG. 4 is a front elevational view of a second embodiment of the ultra high strength clamp assembly showing an umbilical member clamped to a support member.

FIG. 4 shows a second embodiment of the ultra high strength clamp assembly, generally designated as C'. It is to be understood that components which have been modified in the clamp assembly C' will be designated with the like two digit reference numeral used above in describing the clamp assembly C of the first embodiment but preceded with a "1." The same two digit reference numeral is used if the component is the same in the first and second embodiments.

The tensioner assembly 130 includes first and second tensioner bars 132 and 134, respectively, and a pair of adjusting members 144. The first tensioner bar 132 has an upper bore 132B and a lower bore (not shown) having a threaded portion. The second tensioner bar 134 has a lower bore (not shown) and an upper bore 134B' having a threaded portion. It is to be understood that the lower bore of the second tensioner bar 134 is similar to the upper bore 132B of the first tensioner bar 132. Similarly, the lower bore of the first tensioner bar 132 is similar to the upper bore 134B' of the second tensioner bar 134. It is also to be understood that alternatively the first tensioner bar 132 could have a pair of bores 132B and the second tensioner bar 134 could have a pair of bores 134B' having a threaded portion or vice versa.

Referring to FIG. 4, the adjusting members 144 include a drive portion 144B. A first adjusting member 144 is inserted through the upper bore 132B and threadedly received within the upper bore 134B'. The second adjusting member 144 is inserted through the lower bore of the second tensioner bar 134 and threadedly received in the lower bore of the first tensioner bar 132. The first and second adjusting members 144 serve to adjust the spacing between the tensioner bars 132 and 134. The tensioner bars 132 and 134 include bullnose faces as previously described. The ultra high strength clamp assembly C' eliminates the frame 36 by adding a second adjusting member 144. The installation of the ultra high strength clamp assembly C' is similar in all respects to the installation of the ultra high strength clamp assembly C described above. The difference being that the ultra high strength clamp assembly C' requires that a pair of adjusting members 144 be advanced to secure the clamp assembly C'.

Figure 5:
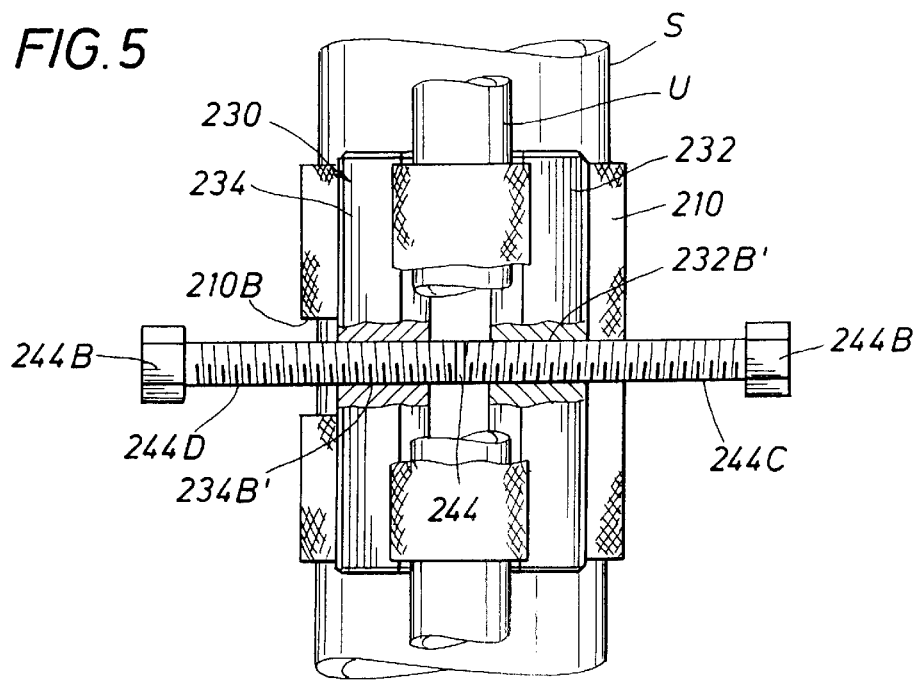
FIG. 5 is a front elevational view of a third embodiment of the ultra high strength clamp assembly showing an umbilical member clamped to a support member.
Figure 6:
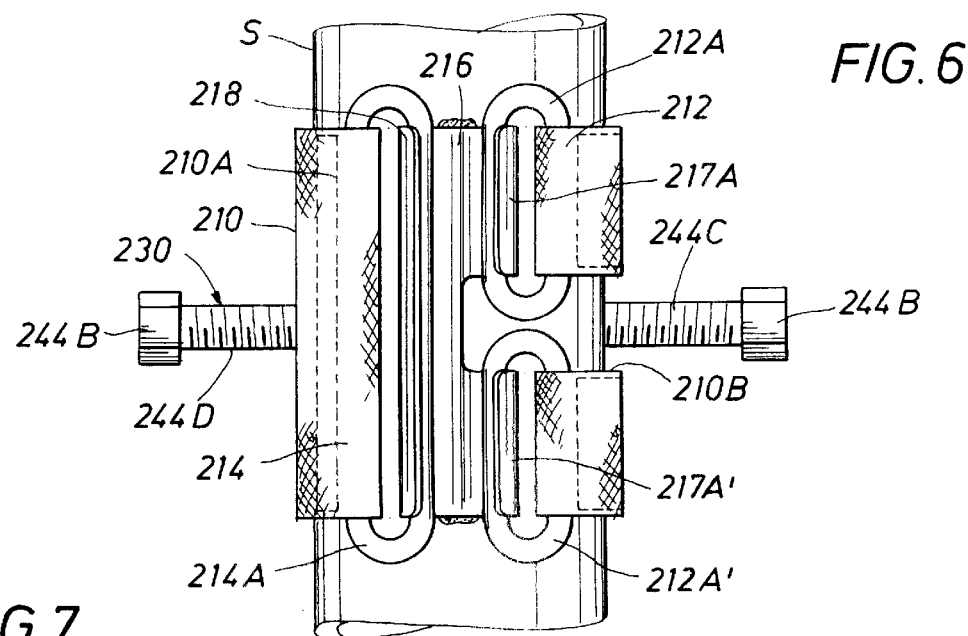
FIG. 6 is a rear elevational view of the third embodiment of the ultra high strength clamp assembly of FIG. 5.
Figure 7:
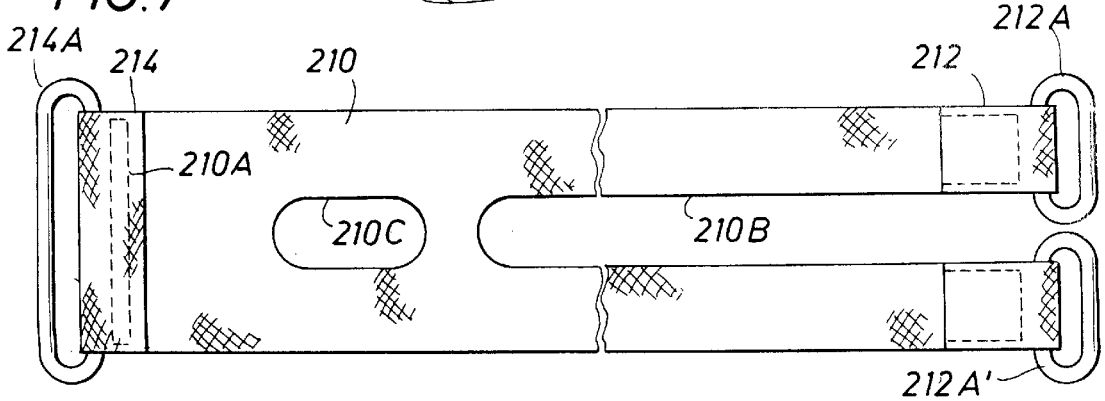
FIG. 7 is a plan view of the strap assembly for the third embodiment of the ultra high strength clamp assembly of FIG. 5.

FIGS. 5–7 show a third embodiment of the ultra high strength clamp assembly, generally designated as C". Referring to FIGS. 5–7, the ultra high strength clamp assembly C" comprises a strap 210, preferably flexible, having first and second ends 212 and 214, respectively, and a tensioner assembly 230.

Referring to FIG. 7, the flexible strap 210 has a length sufficient to allow the strap 210 to extend substantially around the elongate and support members U and S, respectively. The flexible strap 210 includes an elongated slot 210B extending from the first end 212 of the flexible strap 210 for reasons which will be explained below. Preferably, the flexible strap 210 also includes an elongated hole 210C for reasons which will be explained below. The first and second ends 212 and 214, respectively, are adapted to be coupled to each other or to the support member S. Coupling the ends 212 and 214 to each other can be accomplished in a variety of ways as described above. In the drawings, the coupling is shown as comprising a pair of first end rings 212A and 212A' and a second end ring 214A. The pair of first end rings 212A and 212A' are secured to the first end 212 and the second end ring 214A is secured to the second end 214. Preferably, the pair of first end rings 212A and 212A' and the second end ring 214A are continuous rings and are secured to the ends 212 and 214 of the flexible strap 210 by stitching 210A.

A coupling bracket 216 includes a pair of first longitudinal hooks 217A and 217A' and a second longitudinal hook 218 as shown in FIG. 6. Preferably, the coupling bracket 216 is secured, by welding, to the support member S. The pair of first longitudinal hooks 217A and 217A' are adapted to receive the pair of first end rings 212A and 212A', respectively, as shown in FIG. 6. The second longitudinal hook 218 is adapted to receive the second end ring 214A.

The tensioner assembly 230 includes a first tensioner bar 232 and a second tensioner bar 234 as shown in FIG. 5. The first and second tensioner bars 232 and 234, respectively, are elongate members, generally rectangular in shape. Preferably, each of the tensioner bars 232 and 234 includes a bullnose face (not shown) as previously described. The bullnose faces are in opposing relationship to one another. The first and second tensioner bars 232 and 234 have a transverse bore 232B' and 234B', respectively, centrally located along the length of the tensioner bar 232, 234. The transverse bores 232B' and 234B' preferably include a threaded portion.

The tensioner assembly 230 also includes an adjusting member 244 having first and second threaded portions 244C and 244D, respectively, and a drive portion 244B. Preferably, one of the threaded portions 244C and 244D is right hand threaded and the other threaded portion is left hand threaded. The threaded bores 232B' and 234B' would be threaded in a similar manner. The tensioner bars 232 and 234 are threaded onto the adjusting member 244 with the adjusting member 244 extending through the elongate hole 210C of the flexible strap 210. The flexible strap 210 is situated on the adjusting member 244 between the tensioner bars 232 and 234. This assembly ensures that the flexible strap 210 does not become separated from the tensioner assembly 230.

The installation of the ultra high strength clamp assembly C" will now be described in detail with reference to FIGS. 5–7. Initially, the adjusting member 244 is rotated in such a manner as to enlarge the spacing between the first and second tensioner bars 232 and 234, respectively. It is to be understood that rotation of the adjusting member 244 results in concurrent inward or outward movement of both tensioner bars 232 and 234 depending on the direction of rotation of the adjusting member 244. The second end ring 214A attached to the second end 214 of the strap 210 is hooked to the hook 218 of the coupling bracket 216. The first end 212, extending through the spacing between the tensioner bars 232 and 234, is passed substantially around the umbilical member U and then fed back through the space between the tensioner bars 232 and 234. The pair of first end rings 212A and 212A' secured to the first end 212 are then hooked onto the pair of elongate hooks 217A and 217A' of the coupling bracket 216. As previously explained, other types of fastening arrangements to couple the first and second ends 212 and 214, respectively, are anticipated and within the scope of the present invention. Various means of connecting the ends 212 and 214 are well known to those of ordinary skill in the art.

The adjusting member 244 is rotated to force the first and second tensioner bars 232 and 234 toward one another. As previously described, the continued advancement of the tensioner bars 232 and 234 toward one another eliminates the slack in the flexible strap 210 extending substantially around the umbilical and support members U and S, respectively. The flexible strap 210 contacts the smooth contoured bullnose faces of the tensioner bars 232 and 234, respectively. The adjusting member 244 is advanced until suitable clamping force has been exerted on the assembly to ensure that the umbilical member U remains firmly clamped to the support member S.

Figure 8:
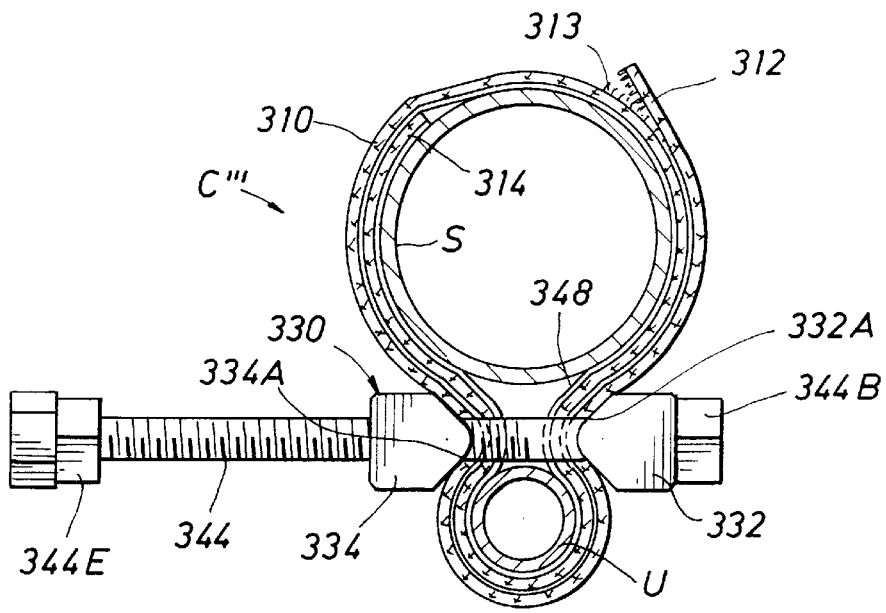
FIG. 8 is a top plan view of a fourth embodiment of the ultra high strength clamp assembly showing an umbilical member clamped to a support member.
Figure 9:
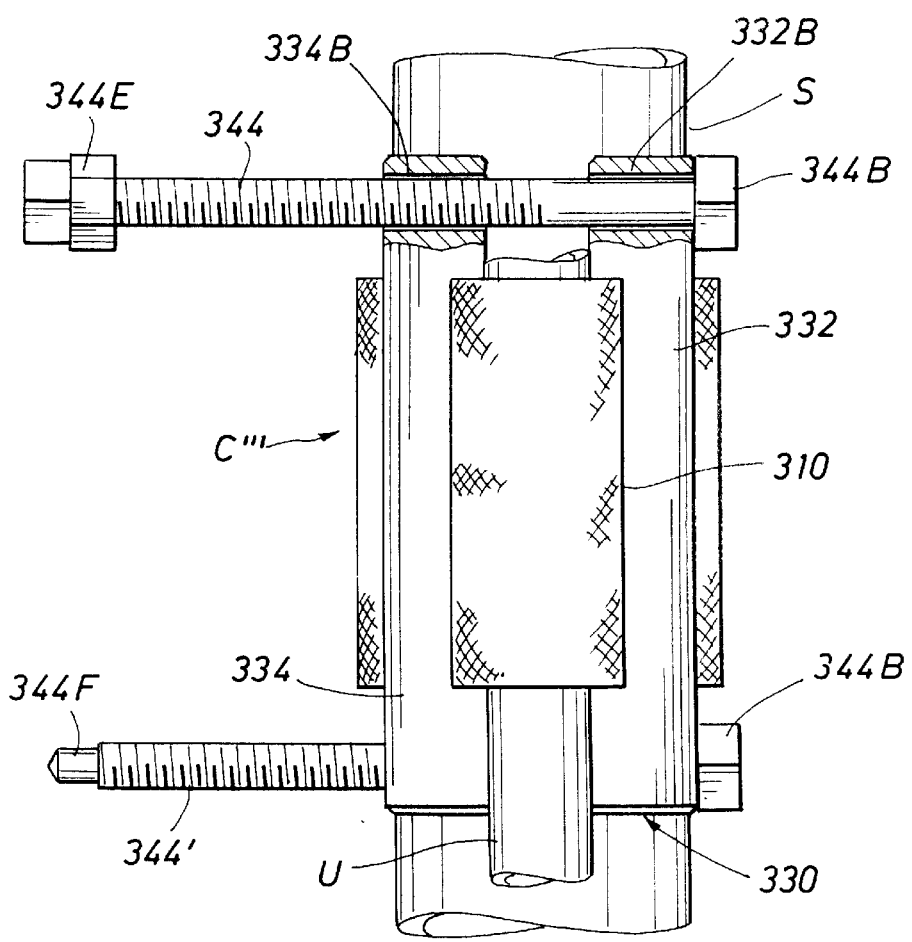
FIG. 9 is a front elevational view of the fourth embodiment of the ultra high strength clamp assembly of FIG. 8.

FIGS. 8 and 9 show a fourth embodiment of the ultra high strength clamp assembly, generally designated as C'''. The fourth embodiment is similar in many respects to the second embodiment as shown in FIG. 4. The ultra high strength clamp assembly C''', comprises a strap 310, preferably flexible, having first and second ends 312 and 314, respectively, and a tensioner assembly 330 as shown in FIGS. 8 and 9.

Referring to FIG. 8, the flexible strap 310 has a length sufficient to allow the strap 310 to extend approximately twice around the elongate and support members U and S, respectively, to essentially form a "double wrap" around the members U and S. Preferably, the second end 312 and a medial portion 313 include hook and loop type fasteners attached thereto as shown in FIG. 8. Preferably, the hook and loop type fasteners are VELCRO products. VELCRO is the registered trademark of Velcro U.S.A., Inc. The medial portion 313 and the second end 312 are adapted to be coupled to each other with the hook and loop type fasteners after the strap 310 has formed the double wrap around the members U and S. It is to be understood that the hook and loop type fasteners are provided for convenience in the installation of the ultra high strength clamp assembly C''' and not for strength. The flexible strap 310 preferably includes a rubber layer 348 or like material for frictionally contacting the elongate and support members U and S, respectively. The rubber layer 348 provides non-abrasive, highly frictional contact with the elongate and support members U and S, respectively, during use of the clamp assembly C'''.

The tensioner assembly 330 includes first and second tensioner bars 332 and 334, respectively, and first and second adjusting members 344 and 344', respectively. The first tensioner bar 332 has an upper bore 332B and a lower bore (not shown). The second tensioner bar 334 has an upper bore 334B having a threaded portion and a lower bore (not shown) having a threaded bore.

Referring to FIG. 9, the adjusting members 344 and 344' include a drive portion 344B. The first adjusting member 344 is inserted through the upper bore 332B and threadedly received within the upper bore 334B. Similarly, the second adjusting member 344' is inserted through the lower bore of the first tensioner bar 332 and threadedly received in the lower bore of the second tensioner bar 334. The first adjusting member 344 preferably includes a pair of jam nuts 344E threaded thereon to prevent the first adjusting member 344 from becoming unthreaded from the second tensioner bar 334. Preferably, the second adjusting member 344' includes a reduced diameter end portion 344F which serves to guide the end portion 344F into the threaded lower bore of the second tensioner bar 334 and provide a quick start for the threaded connection as will be explained below. The first and second adjusting members 344 and 344' serve to adjust the spacing between the tensioner bars 332 and 334. Referring to FIG. 8, the tensioner bars 332 and 334 include bullnose faces 332A and 334A, respectively, as previously described.

It is to be understood that the ultra high strength clamp assembly C''' eliminates the coupling means in the form of rings, buckles or other attachments attached to the first and second ends of the strap and instead relies on frictional contact of the double wrap of the flexible strap 310 around the members U and S. The frictional contact of the strap 310 with the members U and S and the frictional contact between the wraps of the strap 310 provide greater holding capacity. It is also to be understood that further wraps of the strap 310 will provide additional strength and frictional force.

The preferred method of installation of the ultra high strength clamp assembly C''' will now be described in detail. The first and second adjusting members 344 and 344' are unscrewed so that the jam nuts 344E of the first adjusting member 344 contact the second tensioner bar 334 and the second adjusting member 344' is unscrewed from the second tensioner bar 334. The double wrap of the flexible strap 310 is formed around the members U and S and the hook and loop type fasteners join the second end 312 to the medial portion 313 to temporarily hold the strap 310 in place while the tensioner assembly 330 is installed. Since the bottom of the tensioner assembly 330 is now open due to the removal of the second adjusting member 344', the tensioner assembly 330 can now be placed between the members U and S very easily and quickly. The second adjusting member 344' is inserted through the first tensioner bar 332 and the reduced diameter end portion 344F serves to guide the end portion 344F into the threaded lower bore of the second tensioner bar 334 and provide a quick start for the threaded connection. Both of the first and second adjusting members 344 and 344', respectively, are drawn tight to firmly secure the ultra high strength clamp assembly C''' to the members U and S. This method of installation does not require that the first end 312 of the strap 310 be slipped between the tensioner bars 332 and 334, rather the tensioner bars 332 and 334 are slid down over the flexible strap 310 between the members U and S. While the overall result is the same, the speed of installation may be increased with the method described for the fourth embodiment of the present invention.

It is also to be understood that the strap 310 is prevented from coming free or loose from around the members U and S when the tensioner assembly 330 is secured in place, unless the tensioner assembly 330 is released or the strap 310 fails.

It is to be understood that the present invention contemplates that the adjusting member includes other types of securing members which would be well known to those of ordinary skill in the art. For example, the adjusting member could be a camming member which would forcibly adjust the spacing between the first and second tensioner bars.

It is to be understood that the ultra high strength clamp assembly of the present invention is very versatile and has applications in many fields. It is not intended to be limited to the drilling industry, but could be used in virtually any situation requiring the clamping of an elongate member to a support member.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. A clamp assembly for clamping an elongate member to a support member, the clamp assembly comprising:
   a flexible strap having a first end and a second end, said flexible strap for extending substantially around the elongate and support members, said first and second ends adapted to be coupled to each other or to the support member; and a tensioner assembly comprising:
first and second tensioner bars spaced parallel to one another;
an adjusting member for adjusting the spacing between said first and second tensioner bars;
a frame including a post having a bore therethrough and a pair of rods extending from said post, said bore having a threaded portion;
said first tensioner bar having a pair of holes therethrough to receive said rods;
said second tensioner bar secured to said rods; and
said adjusting member threadedly engaging said post, said adjusting member having a first end contacting said first tensioner bar.

2. The clamp assembly of claim 1, wherein said adjusting member further comprises a drive portion for rotatably driving said adjusting member.

3. The clamp assembly of claim 1, wherein said first tensioner bar is slidably received on said pair of rods.

4. A clamp assembly for clamping an elongate member adjacently to a support member, the clamp assembly comprising:
a non-rigid, flexible strap having a width, a length, a first end and a second end, said flexible strap for extending at least substantially around the combination of the adjacent elongate and support members; and
a tensioner assembly for passing between the elongate and support members and contactingly engaging said flexible strap, said tensioner assembly comprising:
first and second tensioner bars spaced parallel to one another and having a space therebetween;
a first rod interconnecting said first and second tensioner bars;
a second rod interconnecting said first and second tensioner bars; and
means for adjusting the spacing between said first and second tensioner bars.

5. The clamp assembly of claim 4, wherein said flexible strap passes at least twice through the space between said first and second tensioner bars.

6. The clamp assembly of claim 5, wherein said tensioner assembly is positioned outwardly of said strap passing at least twice through the space between said first and second tensioner bars such that an area between said passes of straps is unobstructed.

7. The clamp assembly of claim 5, wherein said first and second rods interconnect said first and second tensioner bars without penetrating said flexible strap.

8. The clamp assembly of claim 5, wherein said tensioner assembly extends entirely around the at least two passes of said flexible strap.

9. The clamp assembly of claim 4, wherein said first and second tensioner bars have a bar length at least as great as said flexible strap width.

10. The clamp assembly of claim 4, wherein said flexible strap includes a highly frictional layer for contacting the elongate and support members.

11. The clamp assembly of claim 4, wherein each of said first and second tensioner bars include a bullnose face and said bullnose faces are in opposing relationship to one another.

12. The clamp assembly of claim 4, wherein said flexible strap is non-perforated.

* * * * *